Patented Feb. 2, 1926.

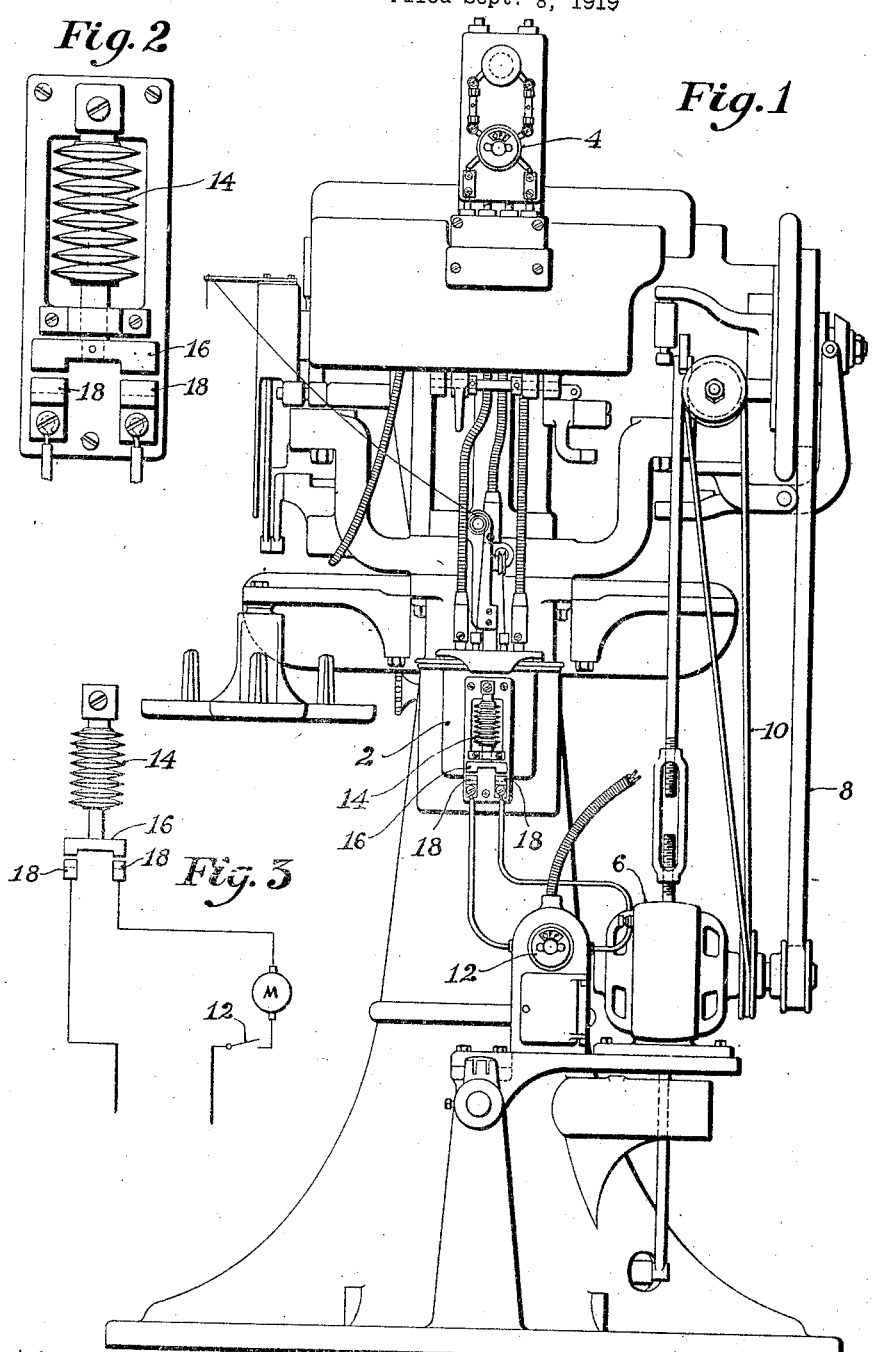

1,571,259

UNITED STATES PATENT OFFICE.

FREDERICK M. FURBER, OF REVERE, MASSACHUSETTS, ASSIGNOR TO UNITED SHOE MACHINERY CORPORATION, OF PATERSON, NEW JERSEY, A CORPORATION OF NEW JERSEY.

CONTROLLING MECHANISM.

Application filed September 8, 1919. Serial No. 322,444.

*To all whom it may concern:*

Be it known that I, FREDERICK M. FURBER, a citizen of the United States, residing at Revere, in the county of Suffolk and State of Massachusetts, have invented certain new and useful Improvements in Controlling Mechanism; and I do hereby declare the following to be a full, clear, and exact description of the invention, such as will enable others skilled in the art to which it appertains to make and use the same.

The invention relates to controlling mechanism for machines which embody one or more heated parts.

Various machines utilized in the manufacture of boots and shoes require one or more of their parts or mechanisms to be heated to a certain temperature before the machines can be successfully operated or before they will operate satisfactorily upon the work presented to them.

The starting of such a machine by the operator before the part or parts which should be heated have reached the proper temperature frequently results in waste of material, breakage of parts, or the production of inferior work. To avoid this the present invention contemplates the provision of means acting to prevent the operative action of the actuating mechanism of a machine of this type or of a mechanism of such machine until the part or parts which should be first heated have reached the temperature requisite for the proper and intended operation of the machine.

The means for thus controlling the operation of the actuating mechanism for the machine, or for one or more of its mechanisms, may be of any form which is suited to the type of actuating mechanism employed and preferably includes a thermostat associated with the heated part and acting when the temperature reaches a certain point to render inactive the means which up to that time has prevented the operative action of the actuating mechanism. In case an electric motor drive is utilized, the starting of the motor may be and preferably is prevented by a normally open circuit closer included in the motor circuit and arranged to be closed by the thermostat when the temperature of the heated part reaches a certain point. In this case the circuit will remain open until the temperature of the heated part has been raised sufficiently to close the circuit closer even if the operator closes the motor starting switch. If the operator closes the starting switch before the circuit closer is operated the motor will start upon the closing of the circuit closer thus indicating that the machine is in proper condition for operation.

While as above indicated the invention may be applied to various machines, its application to a wax thread sewing machine is illustrated in the accompanying drawing and will be referred to in the following detail description of the preferred form of the invention.

In the drawing Figure 1 is a rear elevation of an outsole stitcher having a preferred form of the invention applied thereto; Fig. 2 is a detail of the thermostat and circuit closer; and Fig. 3 is a diagram showing the motor, starting switch and circuit closer.

In the drawing the invention is shown applied to the outsole lock-stitch sewing machine of Patents No. 1,169,909, Feburary 1, 1916 and No. 1,249,428, December 11, 1917. This machine is provided with several heated parts among which is the wax pot through which the needle thread is drawn during the operation of the machine. Before the machine can operate properly the wax in the wax pot must be heated sufficiently to permit the thread to run freely and any attempt on the part of the operator to start the operation of the machine before the wax has been sufficiently heated results in a waste of the thread drawn through the machine and frequently results in breaking the needle and the delays incident thereto. The other heated parts will be sufficiently heated by the time the wax is in proper condition to start operating the machine, and in applying the invention to this machine, the starting of the machine is therefore prevented until the temperature of the wax pot has been raised to the proper point.

The wax pot of the machine is indicated at 2, and as shown it is heated by an electric current which is turned on and off through the switch indicated at 4. The current for electrically heating the other heated parts may also be controlled by this switch. The actuating mechanism through which the machine is driven includes an electric motor 6 which is connected to drive the main and stop-motion clutches through the belts 8 and 10. The starting switch for the motor is indicated at 12.

The means for preventing the starting of the machine until the wax is properly heated comprises a thermostat 14 attached to the wax pot and operating when expanded by the rise in the temperature of the wax in the pot to close a normally open circuit closer which is included in the motor circuit in series with the starting switch and the motor. The thermostat shown is of the bellows type and it carries the circuit closing bar 16 which is arranged to engage contact terminals 18 when the thermostat is expanded by the heat of the wax. The bar is properly insulated and the terminals are included in the motor circuit so that the circuit remains open at this point until the bar contacts with the terminals. The starting of the motor is therefore dependent upon the closing of the starting switch and the heating of the wax to the proper temperature.

By a duplication of thermostats and circuit closers, the starting of the motor may be prevented until all of a number of parts or mechanisms are heated to the desired temperatures.

What is claimed is:

1. A machine comprising cooperating parts operating when actuated to perform an operation and having a part, the heating of which is a prerequisite to the proper operation of the machine in performing said operation, means for heating said part, actuating mechanism for said cooperating parts, and means for preventing the operative action of the actuating mechanism until the temperature of the heated part is raised to a certain point.

2. A machine comprising cooperating parts operating when actuated to perform an operation and having a part, the heating of which is a prerequisite to the proper operation of the machine in performing said operation, means for heating said part, actuating mechanism for said cooperating parts, and means for controlling the actuating mechanism by the temperature of the heated part.

3. A machine comprising cooperating parts operating when actuated to perform an operation and having a part, the heating of which is a prerequisite to the proper operation of the machine in performing said operation, means for heating said part, a thermostat associated with the said heated part, actuating mechanism for said cooperating parts, and means rendered inactive by the expansion of the thermostat for preventing the operative action of the actuating mechanism.

4. A machine comprising cooperating parts operating when actuated to perform an operation and having a part, the heating of which is a prerequisite to the proper operation of the machine in performing said operation, means for heating said part, mechanism for actuating said cooperating parts, and means for preventing the starting of the actuating mechanism controlled by the temperature of the heated part.

5. A machine comprising cooperating parts operating when actuated to perform an operation and having a part, the heating of which is a prerequisite to the proper operation of the machine in performing said operation, means for heating said part, an electric motor for driving the machine, a normally open circuit closer in the motor circuit, and a thermostat associated with the heated part for closing the circuit closer.

6. A wax-thread sewing machine, having, in combination, a wax pot, means for heating the wax in the pot, driving mechanism, and means for preventing the operative action of the driving mechanism until the temperature of the wax in the wax pot reaches a certain point.

7. A wax-thread sewing machine, having, in combination, a wax pot, means for heating the wax in the pot, a thermostat associated with the wax pot, driving mechanism, and means for controlling the driving mechanism by the thermostat.

8. A wax-thread sewing machine, having, in combination, a wax pot, means for heating the wax in the pot, an electric motor for driving the machine, a thermostat associated with the waxpot, and a circuit closer in the motor circuit operated by the thermostat.

9. A machine comprising cooperating parts operating when actuated to act upon the work presented to them and having a part, the heating of which is a prerequisite to the proper operation of the machine, means for heating the part, mechanism under starting control of the operator for actuating said cooperating parts, and means for preventing the operative action of the actuating mechanism until the temperature of the heated part is raised to a certain point.

10. A machine comprising cooperating parts operating when actuated to perform an operation and having a part, the heating of which is a prerequisite to the proper operation of the machine in performing said operation, means for heating said part, mechanism under starting control of the operator for actuating said cooperating parts, and means for preventing the starting of the actuating mechanism controlled by the temperature of the heated part.

11. A machine comprising cooperating parts operating when actuated to perform an operation and having a part, the heating of which is a prerequisite to the proper operation of the machine in performing said operation, means for heating said part, an electric motor under starting control of the operator for driving the machine, a normally open circuit closer in the motor circuit, and a thermostat associated with the heated part for closing the circuit closer.

FREDERICK M. FURBER.